O. KAMPFE.
HAND RAKE.
APPLICATION FILED JUNE 20, 1910.
975,871.
Patented Nov. 15, 1910.
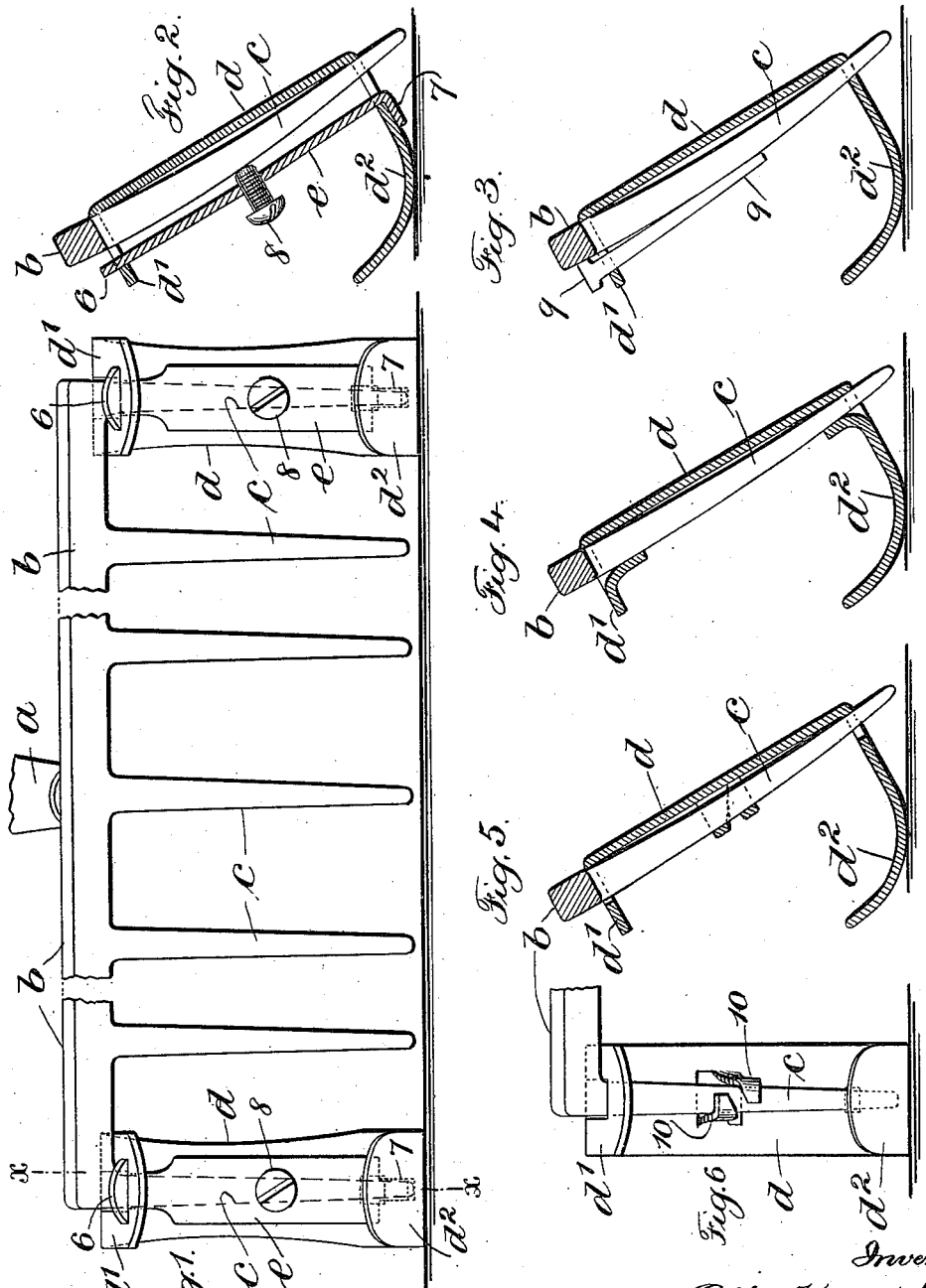
Witnesses
Chas H Smith
Arthur L Serrell
Inventor
Otto Kampfe.
by Harold Serrell
his Atty

UNITED STATES PATENT OFFICE.

OTTO KAMPFE, OF NEW YORK, N. Y.

HAND-RAKE.

975,871.

Specification of Letters Patent. Patented Nov. 15, 1910.

Application filed June 20, 1910. Serial No. 567,792.

*To all whom it may concern:*

Be it known that I, OTTO KAMPFE, a citizen of the United States, residing in the borough of Brooklyn, in the county of Kings, city and State of New York, have invented an Improvement in Hand-Rakes, of which the following is a specification.

My invention relates to an improvement in hand rakes, that is, to an attachment for hand rakes.

My invention has special reference to lawn rakes, or rakes suitable for going over a lawn after the grass has been cut by a mower and raking or gathering up the cut grass for the removal thereof. Wooden rakes have been employed for this purpose, but they leave behind as much cut grass as they gather up. Iron rakes with straight blunt-ended prongs or teeth have also been employed for this purpose, but they are little better than wooden rakes as they fail to gather up the smaller cut particles of grass, and while iron rakes with pointed curved prongs or teeth serve best to gather up the cut grass, they possess the disadvantage of cutting up the soil and tearing the roots of the grass.

My invention relates to an attachment to an iron rake particularly of the latter kind, whereby the pointed ends of the prongs or teeth are slightly raised off the ground so that the cut grass may be raked up without tearing up the earth or grass roots.

My invention comprises a shoe member adapted to receive an end prong or tooth of the rake up to the cross-bar thereof, with means for removably holding the shoe member in place. One of these shoe members is to be connected to each end of the rake and the same is provided with a curved base or foot-plate adapted to slide over the ground with the movement of the rake as the same is held in the hand at an inclination,—all of which is hereinafter more particularly set forth.

In the drawing, Figure 1 is an elevation of the rake broken through for compacting the illustration. Fig. 2 is a vertical section at the dotted line $x$, $x$, of Fig. 1. Figs. 3, 4 and 5 represent by vertical sections the simpler forms of my invention, and Fig. 6 is a rearwise view of the form shown in Fig. 5.

$a$ represents the lower end of the usual rake-handle; $b$ the bar or cross-bar of the rake from which the prongs or teeth $c$ project downward.

The shoe member comprises a main bar $d$, a top bar $d^1$ and a foot-bar or plate $d^2$. This shoe member is alike in all the figures of the drawing as so far described.

Referring particularly to Figs. 1 and 2, which illustrate the preferred form of my invention, I employ a brace plate $e$, with a locking-top 6, a bent finger 7 at the lower end and a screw 8 for clamping. The top bar $d^1$ and foot bar $d^2$ of the shoe member are perforated to receive the end prong or tooth of the rake which is passed through these openings as shown in the drawings; the under side of the cross-bar $b$ resting upon the upper surface of the top bar $d^1$ of the shoe member.

Figs. 1 and 2 will indicate the construction of the brace-plate $e$; the upper portion is narrow to fit in the opening in the top bar $d^1$ and then broadened with shoulders to rest upon the upper surface of the top bar, and the lower end of the brace-bar is cut away so as to provide the finger 7 which is bent and of the form shown, to pass through the opening provided in the foot-bar or plate $d^2$, and when the screw 8 is turned against the back of the prong or tooth $c$, the brace-bar is carried with force to one end of the openings in the bars $d^1$ $d^2$ and the prong or tooth $c$ is forced against the other edge of the openings in the position shown in Fig. 2 so as to clamp the shoe member securely in position.

In use the rake-handle is inclined and the prongs or teeth are inclined. This causes the weight of the rake to rest upon the curved portion of the foot-bar $d^2$ and with one shoe member on each end of the rake the same readily slides over the surface of the ground and the height of the pointed ends of the prongs or teeth $c$ above the ground is readily regulated by the inclination of the handle.

In the simpler forms of my invention shown in Figs. 3 to 6 inclusive, I do not employ the brace-plate or the clamping screw.

Referring particularly to Fig. 3, the perforation in the foot-plate $d^2$ may be made smaller,—just sufficient to receive the point of the prong or tooth $c$. The perforation in the top-bar $d^1$ may be made larger and an ordinary cut nail 9 may be driven into the perforation in the plate $d^1$ back of the bar $b$ and prong $c$ of the rake to hold the shoe member in position.

In Fig. 4 the metal from the top bar $d^1$ and foot-bar $d^2$ produced as a tongue in making the perforation in said bars may be turned toward one another so as to produce spring members to bind against the back of the prong or tooth $c$ and to make it possible to drive the shoe member onto the end teeth or prongs of the rake.

In Figs. 5 and 6, the openings in the top bar $d$ and foot bar $d^1$ are to be slightly larger and sufficient to receive the prong or tooth $c$, and lugs or fingers 10 are produced by cutting an opening at about the center of the main bar $d$ of the shoe member and bending the same backward and the points toward one another so as to form a holdfast of spring character through which the end prong or tooth of the rake is forced as the shoe member is driven to place on the rake. Therefore the essential feature of my invention comprises the shoe member with suitable means connected therewith to hold the same in position to a tooth or prong of the rake.

I do not limit the device of my invention to being placed against the cross-bar $b$ of the rake for the reason that rakes adapted to receive the attachment of my invention do not have prongs or teeth all of the same length; manufacturers varying the length of the prongs or teeth of their rakes. To accommodate this condition it is possible to vary the position of the device of my invention,—especially the preferred form shown in Figs. 1 and 2,—upon and along the teeth of the rake to adjust the position thereof with reference to the pointed end of the tooth clamping the same by the screw firmly in place.

I claim as my invention:

1. A shoe member attachment for a rake, comprising a main bar and top and bottom bars at the ends thereof bent at approximately right angles to the main bar, and the top and bottom bars perforated to receive a prong or tooth of a rake so that the main bar lies substantially parallel with the prong or tooth, and means associated with the shoe member for engaging a prong or tooth for removably securing the shoe member in place.

2. A shoe member attachment for a rake, comprising a main bar and top and bottom bars at the ends thereof bent at approximately right angles thereto and each provided with a perforation, starting from the main bar, and the perforations adapted to receive a prong or tooth of a rake, and means formed as a substantially inseparable part of the shoe member for engaging a prong or tooth for removably and frictionally securing the shoe member in position.

3. A shoe member attachment for a rake, comprising a main bar, a bar at the upper end bent at approximately right angles thereto, a bar or foot plate at the lower end bent at approximately right angles thereto and made of appreciable length and curved, and said bars perforated at and outwardly from the angle of their union with the main bar and adapted to receive a prong or tooth of a rake, and means associated with said shoe member attachment and providing a holding friction between the same and a prong or tooth so that the shoe member attachment is removably secured in position.

4. A shoe member attachment for a rake, comprising a main bar, a bar at the upper end bent at approximately right angles thereto, a bar or foot plate at the lower end bent at approximately right angles thereto and made of appreciable length and curved, and said bars perforated at and outwardly from the angle of their union with the main bar and adapted to receive a prong or tooth of a rake, and a brace-plate reduced at its respective ends to pass through the openings in the top and foot-plates as guides, and a screw passing through the brace-plate and adapted to bear with force against the back of a prong or tooth of a rake for holding the shoe member attachment removably in position.

Signed by me this 16th day of June 1910.

OTTO KAMPFE.

Witnesses:
 GEO. T. PINCKNEY,
 E. ZACHARIASEN.